United States Patent [19]

Müller et al.

[11] Patent Number: 4,546,116

[45] Date of Patent: Oct. 8, 1985

[54] PROCESS FOR THE PRODUCTION OF HIGHLY ELASTIC FOAMS CONTAINING URETHANE GROUPS AND FOAMS OBTAINABLE BY THIS PROCESS

[75] Inventors: Hanns P. Müller, Odenthal; Hans Hettel, Cologne; Kuno Wagner; Peter Vogtel, both of Leverkusen, all of Fed. Rep. of Germany

[73] Assignee: Bayer Aktiengesellschaft, Leverkusen, Fed. Rep. of Germany

[21] Appl. No.: 652,930

[22] Filed: Sep. 21, 1984

[30] Foreign Application Priority Data

Oct. 4, 1983 [DE] Fed. Rep. of Germany ....... 3336029

[51] Int. Cl.[4] ...................... C08G 18/14; C08G 18/32
[52] U.S. Cl. .................................... 521/106; 521/118; 521/125; 521/128; 521/160; 521/167; 521/904; 521/908; 528/78
[58] Field of Search ............... 521/106, 125, 118, 128, 521/160, 904, 908; 528/78

[56] References Cited

U.S. PATENT DOCUMENTS

| | | | |
|---|---|---|---|
| 2,911,379 | 11/1959 | Parker et al. | 521/125 |
| 3,041,293 | 6/1962 | Polacek | 521/125 |
| 3,041,295 | 6/1962 | Wiech et al. | 521/125 |
| 3,907,721 | 9/1975 | Gurgiolo | 521/160 |
| 3,943,075 | 3/1976 | Fishbein et al. | 521/125 |
| 4,349,638 | 9/1982 | Narayan | 521/125 |

*Primary Examiner*—Herbert S. Cockeram
*Attorney, Agent, or Firm*—Gene Harsh; Joseph C. Gil; Thomas W. Roy

[57] ABSTRACT

The present invention relates to a process for the production of foams containing urethane groups by reacting polyether polyols with polyisocyanates in the presence of water and in the presence of an alkaline catalyst, a compound containing a labile halogen atom and, optionally, a tertiary nitrogen containing chain extender.

The present invention also relates to the foams obtainable by this process.

20 Claims, No Drawings

PROCESS FOR THE PRODUCTION OF HIGHLY ELASTIC FOAMS CONTAINING URETHANE GROUPS AND FOAMS OBTAINABLE BY THIS PROCESS

BACKGROUND OF THE INVENTION

1. Field of the Invention

This invention relates to a process for the production of open-cell foams containing urethane groups which may be highly elastic and to the foams produced by this process.

2. Description of the Prior Art

Soft, elastic polyurethane foams are widely used in the upholstery industry for the manufacture of upholstered seats and seat backs. Soft, elastic foams are expected to be as comfortable to sit on as foams of natural latex or a combination of standard upholstery materials such as feathers, natural hair or wadding.

A foam intended for use in the upholstery industry is also expected to show maximum strength properties to avoid splitting under mechanical loads of the type applied, for example, during covering with textiles, coupled with extreme hardness for a given gross density ($kg/m^3$). For economic reasons, particular preference is attributed to foams having gross densities of from 15 to 40 $kg/m^3$.

In order to meet these various requirements, attempts have been made to use inert organic or inorganic fillers. In this connection, it is known that solid additives may be introduced into one of the components used for foaming or directly into the foaming mixture, for example by directly introducing the fillers into the mixing chamber of a foaming machine. Attempts have also been made to carry out polymerization reactions in the polyols used for foaming. For example, dispersions of copolymers of styrene and acrylonitrile in polyethers containing hydroxyl groups are well known and commercially available.

In conventional foaming processes, tertiary amines are generally used as catalysts. In addition to an unpleasant odor, catalysts such as these have the disadvantage that they attack the lacquer finishes of upholstered furniture. In particular, the nitrocellulose lacquers frequently used are destroyed by the tertiary amines. In addition, it has not yet been possible on an industrial scale to foam mixtures of TDI (tolylene diisocyanate) and MDI (4,4'- and/or 2,4'-diphenylmethane diisocyanate) in soft foam block formulations in such a way that foams having increased indentation hardness are obtained (cf. Comparison Example III).

The object of the present invention is to avoid these disadvantages and, in addition, to provide in a technically simple manner foams which can be produced in a very wide range of gross densities and which show extreme hardness for a predetermined gross density.

Surprisingly, this object can be achieved by carrying out production of the polyurethane foams from polyols, polyisocyanates, water, and, optionally, emulsifiers, stabilizers and organic blowing agents in the presence of the combination according to the invention of catalysts, a compound containing labile halogen and, optionally, crosslinking agents. The fact that this particular combination (when crosslinking agents are present) gives highly elastic foams having the higher hardness levels required is surprising and was not foreseeable to the skilled artisan because it was known from the chemistry of rigid foams that this form of catalysis leads to isocyanurate structures and that the additional use of crosslinking agents generally leads to brittle polyurethane plastics. Accordingly, it may be regarded as extremely surprising that the catalysts according to the invention accelerate urethane and urea formation because the very catalysts described as suitable are known as polymerization catalysts for isocyanates. Through the process according to the invention, it has been possible to produce foams which, despite their extreme hardness, resemble latex foam in character and can be produced without any odor whatever, depending on the application envisaged.

According to the invention, the combination of cross-linking agent, catalyst and a substance containing labile halogen is preferred because, otherwise, either the foam reaction mixture would collapse (Comparison Example I), or foams disintegrating after aging in hot air would be obtained (Comparison Example II). If the process of the invention is carried out without the specific cross-linking agent, "super-soft" foams are obtained. The preparation of these foams is also an object of the present invention.

SUMMARY OF THE INVENTION

Accordingly, the present invention relates to a process for the production of foams containing urethane groups by reacting polyethers containing at least two hydroxyl groups and having a molecular weight of from 400 to about 10,000 with polyisocyanates in the presence of catalysts and water and optionally in the presence of cross-linking agents, emulsifiers, stabilizers, organic blowing agents and other auxiliaries and additives, characterized in that the reaction is carried out in the presence of (a) about 0.01 to 0.2 g, preferably from about 0.05 to 0.15 g, based on 100 g of the polyether, of an organic or inorganic compound which shows an alkaline reaction in the aqueous medium and in which the group [R—O]$^\ominus$Me$^{\oplus 1}$ is present at least once, Me$^\oplus$ being an alkali metal, optionally in complexed form, or a quaternary ammonium group and R representing hydrogen, alkyl, cycloalkyl, aryl or aralkyl groups, which may also contain heteroatoms, and also the groups R'—CO—, R'—CS—, R'—CO—O, R'—O—, R'—CO—NH— where R' is one of the organic radicals mentioned in the definition of R, (b) a compound containing a labile halogen atom and, optionally, (c) up to about 10 g, preferably from about 0.08 to 7 g, based on 100 g of the polyether, of a crosslinking agent corresponding to the following formula

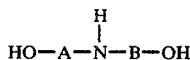

in which A and B may be the same or different and represent $C_2$-$C_8$-alkylene or $C_5$-$C_8$-cycloalkylene radicals.

The present invention also relates to the foams, preferably highly elastic foams, obtainable by the process according to the invention.

DETAILED DESCRIPTION OF THE INVENTION

According to the invention, tolylene diisocyanates are preferably used as the polyisocyanates. Other preferred polyisocyanates are mixtures of tolylene diisocyanates with phosgenation products of anilineformaldehyde condensates. The preferred crosslinking agent (c) is diethanolamine, while alkali hydroxides are preferably used as the alkaline-reacting compound (a). According to the invention, the compounds containing labile halogen (b) are preferably halogenated aliphatic phosphoric acid esters and, more preferably, trichloroethyl phosphate. It is also preferred to use crosslinking agent (c) in the process of the invention.

The following materials are used for carrying out the process according to the invention:

1. Suitable polyisocyanates to be used as starting components are aliphatic, cycloaliphatic, araliphatic, aromatic and heterocyclic polyisocyanates of the type described by W. Siefken in Justus Liebigs Annalen der Chemie, 562, pages 75 to 136, for example those corresponding to the following formula $$Q(NCO)_n$$

in which: n=2-4, preferably 2, and Q represents an aliphatic hydrocarbon radical containing from 2 to 18 carbon atoms and preferably from 6 to 10 carbon atoms, a cycloaliphatic hydrocarbon radical containing from 4 to 15 carbon atoms and preferably from 5 to 10 carbon atoms, an aromatic hydrocarbon radical containing from 6 to 15 carbon atoms and preferably from 6 to 13 carbon atoms, or an araliphatic hydrocarbon radical containing from 8 to 15 carbon atoms and preferably from 8 to 13 carbon atoms. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (German Auslegeschrift No. 12 02 785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate and naphthylene-1,5-diisocyanate.

According to the invention, it is also possible to use triphenylmethane-4,4',4''-triisocyanate; polyphenyl polymethylene polyisocyanates of the type obtained by condensing aniline with formaldehyde, followed by phosgenation, and described for example in British Pat. Nos. 874,430 and 848,671; m- and p-isocyanatophenyl sulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) and in German Offenlegungsschrift Nos. 25 04 400, 25 37 685 and 25 52 250; norbornane diisocyanates according to U.S. Pat. No. 3,492,330; polyisocyanates containing allophanate groups of the type described, for example, in British Pat. No. 994,890, in Belgian Pat. No. 61,626 and in Dutch Patent Application No. 7,102,524; polyisocyanates containing isocyanurate groups of the type described, for example, in U.S. Pat. No. 3,001,973, in German Pat. Nos. 1,022,789, 1,222,067 and 1,027,394 and in German Offenlegungsschrift Nos. 9 29 034 and 20 04 048; polyisocyanates containing urethane groups of the type described, for example, in Belgian Pat. No. 752,261 or in U.S. Pat. Nos. 3,394,164 and 3,644,457; polyisocyanates containing acylated urea groups according to German Pat. No. 1,230,778; polyisocyanates containing biuret groups of the type described for example, in U.S. Pat. Nos. 3,124,605 and 3,201,372 and in British Pat. No. 889,050; polyisocyanates produced by telomerization reactions of the type described, for example, in U.S. Pat. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned diisocyanates with acetals according to German Pat. No. 1,072,385; and polyisocyanates containing polymeric fatty acid esters according to U.S. Pat. No. 3,455,883.

It is also possible to use the isocyanate-group-containing distillation residues obtained in the commercial production of isocyanates, optionally in solution in one or more of the above-mentioned polyisocyanates. It is additionally possible to use any mixtures of the above-mentioned polyisocyanates.

In general, it is preferred to use the commercially readily available polyisocyanates, for example 2,4- and 2,6-tolylene diisocyanate and mixtures of these isomers ("TDI"), polyphenyl polymethylene polyisocyanates of the type obtained by condensing aniline with formaldehyde, followed by phosgenation ("crude MDI"), and polyisocyanates containing carbodiimide groups, urethane groups, allophanate groups, isocyanurate groups, urea groups or biuret groups ("modified polyisocyanates"), particularly modified polyisocyanates of the type derived from 2,4- and/or 2,6-tolylene diisocyanate or from 4,4'- and/or 2,4'-diphenylmethane diisocyanate.

According to the invention, tolylene diisocyanates or mixtures thereof with the phosgenation products of aniline-formaldehyde condensates are especially preferred. In accordance with the present invention, the isocyanate index, i.e. the equivalent ratio of isocyanate groups to isocyanate-reactive groups times 100, is about 100-250, preferably about 105 to 180.

2. Suitable polyethers to be used as further starting components are those containing at least two hydroxyl groups and having a molecular weight of 400 to about 10,000. Preferred polyethers are those containing from 2 to 8 hydroxyl groups, especially those having a molecular weight of about 3000 to 6000, optionally in conjunction with polyesters, polythioethers, polyacetals, polycarbonates and polyester amides in quantities from about 0.5 to 50% by weight and preferably from about 1 to 30% by weight, based on the polyether.

(a) The polyethers containing at least 2, preferably 2 to 8 and more preferably 2 to 3 hydroxyl groups suitable for use in accordance with the invention are known per se and are obtained, for example, by polymerizing epoxides, such as ethylene oxide, propylene oxide, butylene oxide, styrene oxide or epichlorohydrin on their own, for example, in the presence of Lewis catalysts, such as $BF_3$, or by the addition of these epoxides, preferably ethylene oxide and propylene oxide, optionally in admixture or successively, with starter components containing reactive hydrogen atoms. Suitable starter components include water, alcohols, ammonia or amines such as ethylene glycol, 1,3- or 1,2-propylene glycol, trimethylol propane, glycerol, sorbitol, 4,4'-dihydroxy diphenyl propane, aniline, ethanolamine or ethylene diamine. Sucrose polyethers of the type described in German Auslegeschrift Nos. 11 76 358 and 10 64 938 and formitol- or formose-started polyethers (German Offenlegungsschrift Nos. 26 39 083 and 27 37 951) may also be used in accordance with the invention. In many cases, it is preferred to use polyethers which predominantly contain primary OH-groups (up to 90% by weight, based on all the OH-groups present in the polyether). Polybutadienes containing OH-groups are also suitable for use in accordance with the invention.

(b) Among the polythioethers, reference is made in particular to the condensation products of thiodiglycol on its own and/or with other glycols, dicarboxylic acids, formaldehyde, aminocarboxylic acids or aminoalcohols. Depending on the co-components, the products in question are polythio mixed ethers, polythioether esters or polythioether ester amides.

(c) Suitable polyacetals are, for example, the compounds obtainable from glycols, such as diethylene glycol, triethylene glycol, 4,4'-dioxethoxy diphenyl dimethyl methane or hexane diol and formaldehyde. Polyacetals suitable for use in accordance with the invention may also be obtained by polymerizing cyclic acetals such as trioxane (German Offenlegungsschrift No. 16 94 128).

(d) Suitable polycarbonates containing hydroxyl groups are known per se and may be obtained by reacting diols (such as 1,3-propane diol, 1,4-butane diol, 1,6-hexane diol, diethylene glycol, triethylene glycol, tetraethylene glycol or thiodiglycol) with phosgene or diaryl carbonates such as diphenyl carbonate (German Auslegeschrift Nos. 16 94 080, 19 15 908 and 22 21 751; German Offenlegungsschrift No. 26 05 024).

(e) The polyester amides and polyamides include the predominantly linear condensates obtained from polybasic saturated or unsaturated carboxylic acids or their anhydrides and polyhydric saturated or unsaturated aminoalcohols, diamines, polyamines or mixtures thereof.

(f) The polyesters containing hydroxyl groups which may optionally be used in accordance with the invention include reaction products of polyhydric, preferably dihydric and, optionally, also trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated.

Examples of carboxylic acids and their derivatives are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids (optionally in admixture with monomeric unsaturated fatty acids such as oleic acid), terephthalic acid dimethyl ester and terephthalic acid-bis-glycol ester. Suitable polyhydric alcohols include ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, diethylene glycol, triethylene glycol, tetraethylene glycol, higher polyethylene glycols, dipropylene glycol, higher polypropylene glycols, dibutylene glycol and higher polybutylene glycols. The polyesters may contain terminal carboxyl groups. Polyesters of lactones, for example ε-caprolactone, or of hydroxy carboxylic acids, for example ω-hydroxy caproic acid, may also be used.

(g) Polyhydroxyl compounds already containing urethane or urea groups and optionally modified natural polyols, such as castor oil or carbohydrates, for example starch, may also be used. Addition products of alkylene oxides with phenol-formaldehyde resins or even with ureaformaldehyde resins may also be used in accordance with the invention.

(h) Before they are used in the polyisocyanate-polyaddition process, the above-mentioned polyhydroxyl compounds may be modified in various ways. Thus, according to German Offenlegungsschriften No. 22 10 839 (U.S. Pat. No. 3,849,515) and 25 44 195, a mixture of different polyhydroxyl compounds (for example a polyether polyol and a polyester polyol) may be condensed by etherification in the presence of a strong acid to form a relatively high molecular weight polyol which is made up of different segments attached through ether bridges. It is also possible, for example in accordance with German Offenlegungsschrift No. 25 59 372, to introduce amide groups into the polyhydroxyl compounds or, in accordance with German Offenlegungsschrift No. 26 20 487, to introduce triazine groups by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (German Offenlegungsschriften No. 27 14 289, 27 14 292 and 27 14 293). In some cases it is of particular advantage completely or partly to convert the relatively high molecular weight polyhydroxyl compounds into the corresponding anthranilic acid esters by reaction with isatoic acid anhydride as described in German Offenlegungsschriften No. 20 19 432 and 26 19 840 and in U.S. Pat. Nos. 3,808,250, 3,975,428 and 4,016,143. Relatively high molecular weight compounds containing terminal aromatic amino groups are obtained in this way.

According to German Offenlegungsschrift No. 25 46 536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazide groups are described in German Offenlegungsschrift No. 16 94 152 (U.S. Pat. No. 3,625,071).

Representatives of the above-mentioned compounds used in accordance with the invention are described, for example, in High Polymers, Vol. XVI, "Polyurethanes, Chemistry and Technology" by Saunders-Frisch, Interscience Publishers, New York/London, Vol. I, 1962, pages 32 to 42 and pages 44 to 54 and Vol. II, 1964, pages 5-6 and 198-199, and in Kunststoff-Handbuch, Vol. VII, Vieweg-Hochtlen, Carl-Hanser-Verlag, Munich, 1966, for example on pages 45 to 71. It is of course possible to use mixtures of the above-mentioned compounds containing at least 2 hydroxyl groups and having a molecular weight of from 400 to about 10,000.

3. According to the invention, crosslinking agents (component c) corresponding to the following general formula

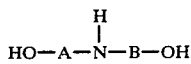

in which A and B may be the same or different and represent $C_2-C_8$-alkylene or $C_5-C_8$-cycloalkylene radicals, may optionally be used as further starting components, but the crosslinking agents are preferably used.

Examples of compounds such as these include diethanolamine, diisopropanolamine, dipropanolamine, dicyclohexanolamine, dioctanolamine. The preferred compound is diethanolamine. The crosslinking agent is added to the foam reaction mixture in a quantity of up to about 10 g, preferably about 0.05 to 10 g, more preferably in a quantity of about 0.08 to 7 g, based on 100 g of polyether.

In addition to the optional crosslinking agents, it is of course possible to use the low molecular weight compounds containing at least two isocyanate-reactive hydrogen atoms and having a molecular weight of from 32 to 400 which are known from polyurethane chemistry.

Examples of compounds such as these include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, trimethylol propane, 1,2,6-hexane triol, trimethylol ethane, glycerol, pentaerythritol, quinitol, formitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxydiphenyl propane, dihydroxymethyl hydroquinone, ethanolamine, triethanolamine, 3-amino propanol, ethylene diamine, 1,3-diaminopropane, 1-mercapto-3-aminopropane, 4-hydroxy- or -aminophthalic acid, succinic acid, adipic acid, hydrazine, N,N'-dimethyl hydrazine, 4,4'-diaminodiphenyl methane, tolylene diamine, methylene-bis-chloroaniline, methylene-bis-anthranilic acid ester, diaminobenzoic acid ester and the isomeric chlorophenylene diamines.

In this case, too, it is possible to use mixtures of the different compounds containing at least two isocyanate-reactive hydrogen atoms and having a molecular weight in the range from 32 to 400.

According to the invention, it is also possible to use amino compounds having a molecular weight of from 32 to 400 in small quantities.

Aliphatic diamines suitable for use in accordance with the invention include ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamine bis-(3-aminopropyl)-methylamine, diaminoperhydroanthracenes (German Offenlegungsschrift No. 26 38 731) and the cycloaliphatic triamines according to German Offenlegungsschrift No. 26 14 244. It is also possible in accordance with the invention to use hydrazine and substituted hydrazines such as methyl hydrazine, N,N'-dimethyl hydrazine and their homologs and also acid dihydrazides such as carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazido-alkylene hydrazides such as β-semicarbazido-propionic acid hydrazide (German Offenlegungsschrift No. 17 70 591), semicarbazido-alkylene carbazinic esters such as 2-semicarbazidoethyl carbazinic ester (German Offenlegungsschrift No. 19 18 504) or even amino-semicarbazide compounds such as β-aminoethyl-semicarbazido-carbonate (German Offenlegungsschrift No. 19 02 931). To control their reactivity, the amino groups may be completely or partly blocked by aldimine or ketimine groups (U.S. Pat. No. 3,734,894; German Offenlegungsschrift No. 26 37 115).

Examples of aromatic diamines are bisanthranilic acid esters according to German Offenlegungsschriften Nos. 20 40 644 and 21 60 590, 3,5- and 2,4-diaminobenzoic acid esters according to German Offenlegungsschrift No. 20 25 900, the diamines containing ester groups described in German Offenlegungsschriften Nos. 18 03 635 (U.S. Pat. Nos. 3,681,290 and 3,736,350), 20 40 650 and 21 60 589, the diamines containing ether groups according to German Offenlegungsschriften Nos. 17 70 525 and 18 09 172 (U.S. Pat. Nos. 3,654,364 and 3,736,295), 2-halogen-1,3-phenylene diamines optionally substituted in the 5-position (German Offenlegungsschriften Nos. 20 01 772, 20 25 896 and 20 65 869), 3,3'-dichloro-4,4'-diaminodiphenylmethane, tolylene diamine, 4,4'-diaminodiphenylmethane, 4,4'-diaminodiphenyldisulfides (German Offenlegungsschrift No. 24 04 976), diaminodiphenyl dithioethers (German Offenlegungsschrift No. 25 09 404), aromatic diamines substituted by alkylthio groups (German Offenlegungsschrift No. 26 38 760), diaminobenzene phosphonic acid esters (German Offenlegungsschrift No. 24 59 491), aromatic diamines containing sulfonate or carboxylate groups (German Offenlegungsschrift No. 27 20 166) and the high-melting diamines described in German Offenlegungsschrift No. 26 35 400. Examples of aliphaticaromatic diamines are the aminoalkyl thioanilines according to German Offenlegungsschrift No. 27 34 574.

According to the invention, other suitable chain extenders are such compounds as 1-mercapto-3-aminopropane, optionally substituted amino acids, for example glycine, alanine, valine, serine and lysine and optionally substituted dicarboxylic acids, for example succinic acid, adipic acid, phthalic acid, 4-hydroxy phthalic acid and 4-aminophthalic acid.

In addition, isocyanate-monofunctional compounds may be used as so-called chain terminators in proportions of from about 0.01 to 10% by weight, based on polyurethane solids. Monofunctional compounds such as these are, for example, monoamines, such as butyl and dibutylamine, octylamine, stearylamine, N-methyl stearylamine, pyrrolidine and cyclohexylamine, monoalcohols, such as butanol, 2-ethylhexanol, octanol, dodecanol, the various amyl alcohols, cyclohexanol, ethylene glycol monoethyl ether.

Other low molecular weight polyols (molecular weight up to 400) suitable for use in accordance with the invention are ester diols corresponding to the following general formulae

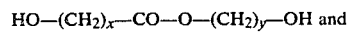

$$HO-(CH_2)_x-O-CO-R-CO-O-(CH_2)_x-OH$$

in which
R represents an alkylene radical containing from 1 to 10 and preferably from 2 to 6 carbon atoms or a cycloalkylene or arylene radical containing from 6 to 10 carbon atoms,
x=2–6 and
y=3–5,
for example δ-hydroxybutyl-ε-hydroxycaproic acid ester, ω-hydroxy hexyl hydroxy butyric acid ester, adipic acid-bis-(β-hydroxyethyl)-ester and terephthalic acid-bis-(β-hydroxyethyl)-ester;
diol urethanes corresponding to the following general formula $$HO-(CH_2)_x-O-CO-NH-R'-NH-CO-O-(CH_2)_x-OH$$

in which
R' represents an alkylene radical containing from 2 to 15 and preferably from 2 to 6 carbon atoms or a cycloalkylene or arylene radical containing from 6 to 15 carbon atoms and
x is a number of from 2 to 6,
for example 1,6-hexamethylene-bis-(β-hydroxyethylurethane) or 4,4′-diphenylmethane-bis-(δ-hydroxybutylurethane); and diol ureas corresponding to the following general formula

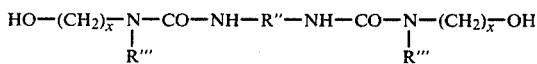

in which
R″ is an alkylene radical containing from 2 to 15 and preferably from 2 to 9 carbon atoms or a cycloalkylene or arylene radical containing from 6 to 15 carbon atoms,
R‴ represents hydrogen or a methyl group and
x is the number 2 or 3,
for example 4,4′-diphenylmethane-bis-(β-hydroxyethylurea) or the compound

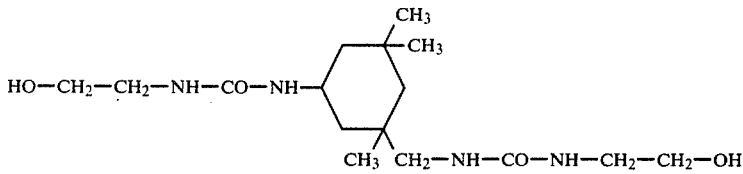

For some purposes, it is of advantage to use polyols containing sulfonate and/or phosphonate groups (German Offenlegungsschrift No. 27 19 372), for example the adduct of bisulfate with 1,4-butane diol or its alkoxylation products.

4. Water is also used in an amount of about 1.8 to 4.5 g, preferably 2 to 4 g based on 100 g of the polyether polyol.

5. According to the invention, another of the starting components used is an organic or inorganic compound (component a) which demonstrates an alkaline reaction in aqueous medium and in which the group $[R-O]^\ominus Me^\oplus$ is present at least once, $Me^\oplus$ being an alkali metal, optionally in complexed form, or a quaternary ammonium group and R representing hydrogen, alkyl (preferably $C_1$-$C_8$-alkyl), aryl (preferably $C_6$-$C_{10}$-aryl) aralkyl (preferably $C_7$-$C_{15}$-aralkyl), cycloalkyl (preferably $C_5$-$C_{10}$-cycloalkyl) groups, which may also contain heteroatoms, and the groups R'—CO—, R'—CS—, R'—CO—O—, R'—O—, R'—CO—NH—, where R' represents one of the organic radicals mentioned in the definition of R.

Examples of catalysts such as these are alkali alcoholates such as sodium methylate, ethylate, propylate, isopropylate, butylate, sodium polypropylene glycolates of linear or branched polypropylene glycol ethers; alkali phenolates; alkali salts of monobasic or polybasic carboxylic acids or sulfonic acids such as potassium benzoate, potassium acetate, potassium oleate, potassium salts of polymerized linseed oil fatty acid, sodium perbenzoate or the sodium salt of a sulfonated castor oil; basically reacting alkali salts or inorganic acids such as tert.-potassium phosphate, sodium borate or potassium carbonate; and preferably alkali hydroxides such as potassium hydroxide or sodium hydroxide. Potassium hydroxide and sodium hydroxide are particularly preferred.

Complexing agents such as cyclic crown ethers (1,4,7,10,13,16-hexaoxacyclooctadecane) or open-chain ligands such as octaethylene glycol or its dimethyl ether may optionally be used. Methyl tricaprylammonium hydroxide is mentioned as an example of a compound containing a quaternary ammonium group.

6. According to the invention, another of the starting components used is a compound containing a labile halogen atom (component b), which is in general used in amounts of 1 to 10 g, preferably 2 to 4 g, based on 100 g of the polyether polyol. Preferred examples of these substances, which are known per se, are halogenated aliphatic phosphoric acid esters such as tristrichloroethyl phosphate, tris-tribromoethyl phosphate, compounds which are known as flameproofing agents in polyurethane chemistry.

7. Optional additives and auxiliaries include
(a) readily volatile organic substances as blowing agents such as acetone, ethyl acetate, halogen-substituted alkanes (such as methylene chloride, chloroform, ethylidene chloride, vinylidene chloride, monofluorotrichloromethane, chlorodifluoromethane and dichlorodifluoromethane), butane, hexane, heptane or diethyl ether. Other examples of blowing agents and information on the use of blowing agents can be found in Kunststoff-Handbuch, Vol. VII, by Vieweg and Hochtlen, Carl-Hanser-Verlag, Munich, 1966, for example on pages 108 and 109, 453 to 455 and 507 to 510.

(b) Catalysts known per se, for example tertiary amines such as triethylamine, tributylamine, N-methyl morpholine, N-ethyl morpholine, N,N,N′,N′-tetramethyl ethylene diamine, pentamethyl diethylene triamine and higher homologs (German Offenlegungsschriften Nos. 26 24 527 and 26 24 528), 1,4-diazabicyclo-(2,2,2)-octane, N-methyl-N′-dimethylaminoethyl piperazine, bis-(dimethylaminoalkyl)-piperazines (German Offenlegungsschrift No. 26 36 787), N,N-dimethylbenzylamine, N,N-dimethylcyclohexylamine, N,N-diethylbenzylamine, bis-(N,N-diethylaminoethyl)-adipate, N,N,N',N'-tetramethyl-1,3-butane diamine, N,N-dimethyl-β-phenylethylamine, 1,2-dimethyl imidazole, 2-methyl imidazole, monocyclic and bicyclic amidines (German Offenlegungsschrift No. 17 20 633), bis-(dialkylamino)-alkyl ethers (U.S. Pat. No. 3,330,782, German Auslegeschrift No. 10 30 558, German Offenlegungsschriften Nos. 18 04 361 and 26 18 280) and tertiary amines containing amide (preferably formamide) groups according to German Offenlegungsschriften Nos. 25 23 633 and 27 32 292. Other suitable catalysts are Mannich bases known per se of secondary amines such as dimethylamine, and aldehydes, preferably formaldehyde, or ketones such as acetone, methyl ethyl ketone or cyclohexanone, and phenols such as phenol, nonyl phenol or bisphenol.

Tertiary amines containing isocyanate-reactive hydrogen atoms suitable for use as catalysts are, for example, triethanolamine, triisopropanolamine, N-methyl diethanolamine, N-ethyl diethanolamine, N,N-dimethyl ethanolamine, reaction products thereof with alkylene oxides such as propylene oxide and/or ethylene oxide, and also secondary-tertiary amines according to German Offenlegungsschrift No. 27 32 292.

Other suitable catalysts are sila-amines containing carbon-silicon bonds, of the type described for example in German Pat. No. 1,229,290 (corresponding to U.S. Pat. No. 3,620,984), for example 2,2,4-trimethyl-2-silamorpholine and 1,3-diethylaminomethyl tetramethyl disiloxane.

Hexahydrotriazines may also be used as catalysts (German Offenlegungsschrift No. 17 69 043).

The reaction between NCO-groups and Zerewitinoff-active hydrogen atoms is also greatly accelerated by lactams and azalactams, an associate between the lactam and the compound containing acid hydrogen initially being formed. Associates such as these and their catalytic effect are described in German Offenlegungsschriften Nos. 20 62 288, 20 62 289, 21 17 576 (U.S. Pat. No. 3,758,444), 21 29 198, 23 30 175 and 23 30 211.

According to the invention, it is also possible to use organometallic compounds, particularly organotin compounds, as catalysts. In addition to sulfur-containing compounds, such as di-n-octyl tin mercaptide (German Auslegeschrift No. 17 69 367; U.S. Pat. No. 3,645,927), preferred organotin compounds are tin-(II) salts of carboxylic acids such as tin-(II) acetate, tin-(II) octoate, tin-(II) ethylhexoate and tin-(II) laurate, and tin-(IV) compounds such as dibutyl tin oxide, dibutyl tin dichloride, dibutyl tin diacetate, dibutyl tin dilaurate, dibutyl tin maleate and dioctyl tin diacetate.

All the above-mentioned catalysts may of course be used in the form of mixtures. In this respect, combinations of organometallic compounds and amidines, aminopyridines or hydrazino pyridines (German Offenlegungsschriften Nos. 24 34 185, 26 01 082 and 26 03 834) are of particular interest.

Further representatives of catalysts suitable for use in accordance with the invention and information on the way in which they work can be found in Kunststoff-Handbuch by Vieweg and Hochtlen, Vol. VII, Carl-Hanser-Verlag, Munich 1966, for example on pages 96 to 102.

These catalysts are generally used in a quantity of up to about 10%, preferably about 0.001 to 10%, by weight, based on the polyethers.

(c) Surface-active additives such as emulsifiers and foam stabilizers. Suitable emulsifiers are, for example, the sodium salts of castor oil sulfonates or salts of fatty acids with amines such as diethylamine oleate or diethanolamine stearate. Alkali or ammonium salts of sulfonic acids such as for example dodecyl benzene sulfonic acid or dinaphthyl methane disulfonic acid, or of fatty acids such as ricinoleic acid, or of polymeric fatty acids, may also be used as surface-active additives.

Suitable foam stabilizers are, above all, polyether siloxanes, particularly water soluble types. The structure of these compounds is generally such that a copolymer of ethylene oxide and propylene oxide is attached to a polydimethyl siloxane residue. Foam stabilizers such as these are described, for example, in U.S Pat. Nos. 2,834,748; 2,917,480 and 3,629,308. In many cases, polysiloxane-polyoxyalkylene copolymers branched through allophanate groups according to German Offenlegungsschrift No. 25 58 523 are of particular interest.

(d) Reaction retarders, for example acid-reacting substances such as hydrochloric acid or organic acid halides, also cell regulators known per se such as paraffins or fatty alcohols or dimethyl polysiloxanes and also pigments or dyes and flameproofing agents known per se, for example trischloroethyl phosphate, tricresyl phosphate or ammonium phosphate and polyphosphate, also stabilizers against the effects of aging and weather, plasticizers and fungistatic and bacteriostatic substances as well as fillers such as barium sulfate, kieselguhr, carbon black or whiting.

Further examples of surface-active additives and foam stabilizers, cell regulators, reaction retarders, stabilizers, flameproofing agents, plasticizers, dyes, fungistatic and bacteriostatic agents which may optionally be used in accordance with the invention and information on the way in which these additives are used and on their respective modes of action can be found in Kunststoff-Handbuch by Vieweg and Hochtlen, Vol. VII, Carl-Hanser-Verlag, Munich, 1966, for example on pages 103 to 113.

The process according to the invention is carried out as follows:

According to the invention, the reaction components are reacted by the one-shot process known per se, the prepolymer process or the semi-prepolymer process, in many cases using machines, for example of the type described in U.S. Pat. No. 2,764,565. Particulars of processing machines which may also be used in accordance with the invention can be found in Kunststoff-Handbuch by Vieweg and Hochtlen, Vol. VII, Carl-Hanser-Verlag, Munich, 1966, for example on pages 121 to 205.

Where foaming is carried out in machines, the catalyst/labile hydrogen/optional crosslinker mixture according to the invention may be introduced through a separate pipe or in the presence of the polyethers.

According to the invention, it is also possible in particular to produce cold-hardening foams (cf. British Pat. No. 1,162,517 and DE-OS No. 21 53 086); however, so-called hot-curing foams may also be produced.

The foams produced by the process according to the invention are used, for example, as upholstery materials, mattresses, packaging materials, films for laminating purposes and as insulating materials. The highly elastic foams produced by the process according to the invention are suitable for flame lamination with films, woven fabrics and knitted fabrics of natural and synthetic materials. Films of these foams may also be welded by high frequency and ultrasonic welding.

The process according to the invention is illustrated by the following Examples.

The invention is further illustrated, but is not intended to be limited by the following examples in which all parts and percentages are by weight unless otherwise specified.

TEST A

Demonstration of the catalytic effect of potassium salts on urethane formation

To study urethane catalysis with different alkali salts (complexed by neutral ligands), a gelation test was carried out and the maximum temperature and time required for crosslinking were measured. For each test, a separately prepared catalyst mixture was added to 50 g of polyether A (0.33 OH-equivalents), followed by mixing with quantities of 31.3 g of 2,4-/2,6-tolylene diisocyanate (80:20) (0.36 NCO-equivalents). After addition of the isocyanate, the time required for cross-linking and the maximum reaction temperature were measured.

Quantities of 0.2 g of the catalysts tested were mixed with the quantities indicated in the table of 18-crown-6 in 3 g of acetonitrile and the resulting mixtures were left standing for 24 hours at room temperature.

TABLE 1

| | Kinetic study of urethane catalysis | | | | |
|---|---|---|---|---|---|
| Catalyst | 18-crown-6(**) g | Solution in $CH_2$—CN | Solution in polyether A(*) | Maximum temperature | Gelation time |
| 1. none | — | | | 58 | >30 mins |
| 2. Sn(II)-2-ethyl hexoate | — | + | + | 80 | 28 5 |
| 3. 1,4-diazabicyclo (2,2,2)-octane | — | + | + | 110 | 134 s |
| 4. KSCN | 0.6 | + | + | 50 | >30 mins |
| 5. KI | 0.35 | + | + | 56 | >30 mins |
| 6. KCN | 0.89 | — | + | 70 | 2 s |
| 7. $K_2CO_3$ | 0.42 | — | — | 70 | 35 s |
| 8. KBr | 0.49 | — | + | 45 | >30 mins |
| 9. K—S—C(=S)(OR) | 0.36 | — | + | 86 | 153 s |
| 10. KOCN | 0.72 | — | — | 75 | 55 s |
| 11. $KHCO_3$ | 0.58 | — | — | 84 | 703 s |
| 12. $KCH_3COO$ | 0.59 | — | + | 70 | 17 s |
| 13. KHCOO | 0.69 | — | + | 80 | 84 s |
| 14. $KC_4H_9O$ | 0.52 | — | + | 80 | 23 s |
| 15. KOH | 0.94 | — | + | 80 | 15 s |

(*)Polyether A: trimethylol propane-started propylene oxide polyether, OH number 380, F = 3.
(**)1,4,7,10,13,16-hexaoxacyclo-octadecane

TEST B

Demonstration of the catalytic effect of potassium salts on urea formation

The following test was used to investigate the reaction of tolylene diisocyanate with $H_2O$. Quantities of 0.2 g of finely powdered K-salt and the molar quantity of 18-crown-6 were dissolved in 20 g of acetonitrile and 1.62 g of water (0.09 mole). These catalyst solutions were then added to prepared solutions of 17.4 g (0.1 mole) of 2,4-/2,6-tolylene diisocyanate (80:20) in 30 g of acetonitrile. The time taken for 1 liter of $CO_2$ to be given off was then measured with stirring; in addition, the maximum temperature of the mixture was measured.

TABLE 2

| | Kinetic study of the isocyanate/water reaction | | | |
|---|---|---|---|---|
| Catalyst | 18-crown-6 g | Solution yes (+) no (−) | Temperature °C. | 1 liter of $CO_2$ (t) |
| 1. none | — | | | 60 mins |
| 2. 1,4-diazabicyclo-(2,2,2)-octane | — | + | 56 | 53 s |
| 3. KOH | 0.94 | + | 70 | 20 s |
| 4. KCN | 0.89 | + | 56 | 90 s |
| 5. $KCH_3COO$ | 0.59 | + | 50 | 3 mins |
| 6. KOCN | 0.72 | + | 42 | 6 mins |
| 7. KHCOO | 0.69 | + | 37 | 10 mins |
| 8. KBr | 0.49 | + | 24 | >60 mins |
| 9. KSCN | 0.60 | + | 24 | >60 |
| 10. KI | 0.35 | + | 24 | >60 mins |
| 11. $KHCO_3$ | 0.58 | — | 46 | 3.5 mins |

TEST C

Preparation of an activator solution 5.99 g (0.11 mole) of powdered potassium hydroxide, 28.22 g (0.11 mole) of 18-crown-6 and 34.2 g of dipropylene glycol were stirred under nitrogen for 1.5 hours at 60° C. A clear, yellow, medium-viscosity 50% solution of the activator in dipropylene glycol was obtained after cooling (OH-number calculated: 418).

TEST D

Preparation of an activator-crosslinker solution 6 g of potassium hydroxide (0.11 mole) were dissolved in 100 g of ethanol. 500 g of diethanolamine (4.76 moles) were introduced into the resulting solution. The ethanol was then distilled off in a water jet vacuum (up to 60° C.). A clear, colorless, low-viscosity activator-crosslinker solution (viscosity $\eta 25°$ C. = 569 mPas, OH-number 1581) was obtained.

TEST E

Preparation of an activator solution 100 g of KOH (solid) were dissolved under nitrogen at room temperature in a mixture of 1100 g of ethanol and 1000 g of dipropylene glycol, the temperature of the mixture rose to 35° C. After a solution had formed, a water jet vacuum was applied and the ethanol was distilled off at a sump temperature of up to 60° C. A clear, colorless, low-viscosity activator solution was obtained in this way.

TEST F

Preparation of an activator 100.7 g (0.25 mole) of methyl tricaprylammonium chloride were dissolved at room temperature in 100.7 g of ethanol. A prepared solution of 14 g (0.25 mole) of KOH in 100 g of ethanol was then added to the above solution. The mixture was stirred for 30 minutes at room temperature; a colorless deposit (KCl) was formed. The activator solution was then filtered off from the deposit and the solvent distilled off in vacuo. A light brown, medium-viscosity activator (yield 100 g) having the following structure

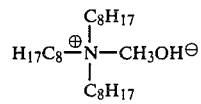

was obtained in this way.

TEST G

Preparation of an activator 56.1 g (1 mole) of potassium hydroxide were powdered and added to 444 g (1.2 moles) of polyethylene glycol (molecular weight 400). After stirring under nitrogen for 3 hours, a clear, brown activator solution had formed. OH number: 224. Viscosity $\eta 25°$ C.=3040 mPas.

EXAMPLES 1 to 9

The production of foams in accordance with the invention is shown in Tables 3 and 4 along with Comparison Examples I to III. The foams were produced both by hand in the form of buns and also in a UBT-machine (standard commercially available mixing machine) with a polyol output of 30 kg/minute. The catalysts according to tests C, E and G and also the catalyst-crosslinker solution according to test D were used in the machine tests. The components were again separately introduced; in this case, the KOH was used in solution in water. In these tests, it was found that the method of introduction of the catalyst-crosslinker did not affect foam production.

In the production of the foam buns, the components, apart from the isocyanate, were successively weighed into a paper cup as indicated in Tables 3 and 4 and thoroughly mixed with a high-speed stirrer. The indicated quantity of isocyanate was then introduced into the stirred mixture which was mixed for 30 seconds and then poured out into the paper mold. The foams had formed after a rise time of 90 to 110 seconds.

TABLE 3

| Example | 1 | Comparison Examples I | Comparison Examples II | 2 | 3 | 4 | 5 | Comparison Example III |
|---|---|---|---|---|---|---|---|---|
| Polyether (1) | 100 | 100 | 100 | 100 | 100 | 100 | 100 | 100 |
| H$_2$O | 3.0 | 3.0 | 3.0 | 3.0 | 2.0 | 3.0 | 3.5 | 3.0 |
| Polysiloxane stabilizer (KS 53, BAYER AG) | 0.3 | 0.3 | 0.3 | 0.3 | 0.5 | 0.15 | 0.15 | 0.3 |
| Diethanolamine | 5.0 | 5.0 | 5.0 | 5.0 | 3.0 | 1.0 | 1.0 | 1.0 |
| Glycerol | — | — | — | — | — | 1.0 | 1.5 | — |
| Trichloroethylphosphate | 2.0 | 2.0 | — | 2.0 | 2.0 | 2.0 | 2.0 | — |
| KOH | 0.06 | — | 0.06 | 0.06 | 0.15 | 0.1 | 0.1 | — |
| Amine catalyst (2) | — | — | — | — | — | 0.3 | 0.5 | 0.2 |
| Amine catalyst (3) | — | — | — | — | — | — | — | 0.3 |
| Tin catalyst (4) | 0.025 | 0.025 | 0.025 | 0.025 | — | — | — | — |
| Trichloromonofluoromethane | — | — | — | — | — | — | 10 | — |
| Polyisocyanate (5) | 51.3 | 51.3 | 51.3 | — | — | 27.0 | 28.3 | 25.0 |
| Polyisocyanate (6) | — | — | — | 51.3 | 65.1 | — | — | — |
| Polyisocyanate (7) | — | — | — | — | — | 27.0 | 28.3 | 25.0 |
| (Index) | 107 | 107 | 107 | 107 | 180 | 110 | 100 | 105 |
| Gross density kg/m$^3$ | 34 | 34 | 37 | 44 | 35 | 24 | 33 |   |
| Tensile strength KPa | 80 |   | 81 | 95 | 100 | 60 | 50 | 80 |
| Breaking elongation % | 105 |   | 105 | 100 | 70 | 90 | 100 | 110 |
| Compression hardness KPa (for 40% compression) | 2.3 |   | 2.3 | 3.0 | 10.0 | 3.1 | 1.4 | 1.2 |
| Compression set % (for 90% compression) | 3.6 |   | 3.2 | 4.5 | 10 | 3.0 | 6.0 | 9.0 |

TABLE 4

| Example | 6 | 7 | 8 | 9 |
|---|---|---|---|---|
| Polyether (1) | — | 100 | — | — |
| Polyether (8) | 100 | — | 100 | 100 |
| Polyisocyanate (5) | 35.7 | 6.82 | — | 59.8 |
| Polyisocyanate (6) | — | 27.3 | 35.7 | — |
| Index | 105 | 105 | 105 | 105 |
| H$_2$O | 2.7 | 2.7 | 2.7 | 5.0 |
| KOH (10% in octaethylene glycol) | 0.3 | 0.3 | 0.3 | 0.3 |
| Foam stabilizer (OS 22, Goldschmidt AG) | 0.8 | — | 1.0 | 1.4 |
| Foam stabilizer (OS 15, Goldschmidt AG) | — | 0.8 | — | — |
| Tin catalyst (4) | 0.18 | 0.2 | 0.24 | 0.24 |
| Trichloroethyl phosphate | 2 | 2 | 2 | 2 |
| Rise time sec. | 120 | 105 | 120 | 100 |
| Cream time sec. | 15 | 15 | 20 | 25 |
| Gross density kg/m$^3$ | 36 | 39 | 37 | 20 |
| Tensile strength KPa | 105 | 105 | 105 | 100 |
| Breaking elongation % | 180 | 180 | 165 | 155 |
| Compression hardness KPa (at 40% compression) | 3.0 | 4.5 | 3.8 | 1.2 |

TABLE 4-continued

| Example | 6 | 7 | 8 | 9 |
|---|---|---|---|---|
| Compression set % (at 90% compression) | 2.9 | 3.2 | 3.5 | — |
| Temperature and air-moisture test [DIN 53578] | | | | |
| (a) Decrease of compression hardness % | 26 | 20 | 28 | — |
| (b) Compression set % (at 90% compression) | 5.0 | 5.0 | 6.5 | super soft foam |

Remarks:

Comparison Example I without KOH: collapse

Comparison Example II without trichloroethyl phosphate: foam disintegrates after aging in hot air Comparison Example III poor compression hardness for predetermined gross density Example 3 high index: semi-rigid foams Example 4 highly elastic (1) A trimethylol propane-started polyol of propylene and ethylene oxide containing approximately 70% of primary OH groups, having an average molecular weight of 4000 and an OH number of 35.

(2) 1,4-diazabicyclo[2,2,2]octane, 33% in dipropylene glycol (3) Bis-(dimethylamino)-ethyl ether (4) Sn(II)-2-ethylhexoate (5) Tolylene diisocyanate (80% by weight of 2,4- and 20% by weight of 2,6-isomer)

(6) Tolylene diisocyanate (65% by weight of 2,4- and 35% by weight of 2,6-isomer)

(7) The phosgenation product of an aniline formaldehyde condensate, NCO content 31%, viscosity 200 mPa.s (8) A trimethylol propane-initiated polyol of propylene oxide and ethylene oxide with secondary OH groups and an OH number of 45.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a foam containing urethane groups by reacting a polyether containing at least two hydroxyl groups and having a molecular weight of 400 to about 10,000 with a polyisocyanate comprising a member selected from the group consisting of toluene diisocyanates, phosgenation products of aniline-formaldehyde condensates and mixtures thereof in the presence of water and
    (a) about 0.01 to 0.2 parts, based on 100 parts of said polyether, of an organic or inorganic compound which shows an alkaline reaction in aqueous medium and in which the group $(R-O)^{\ominus}Me^{\oplus}$ is present at least once, wherein
        $Me^{\oplus}$ is an alkali metal, optionally in complexed form, or a quaternary ammonium group and
        R represents hydrogen, alkyl, cycloalkyl, aryl, or aralkyl groups, which may also contain hetero atoms, and also the groups $R'-CO-$, $R'-CS-$, $R'-CO-O-$, $R'-O-$ and $R'-CO-NH$, where $R'$ is one of the organic radicals mentioned in the definition of R,
    (b) a compound containing a labile halogen atom and,
    (c) about 0.05 to 10 parts, based on 100 parts of said polyether, of a crosslinking agent corresponding to the formula

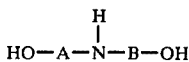

wherein A and B may be the same or different and represent $C_2-C_8$-alkylene or $C_5-C_8$-cycloalkylene radicals.

2. The process of claim 1 wherein said polyisocyanate is toluene diisocyanate.

3. The process of claim 1 wherein said polyisocyanate is a mixture of toluene diisocyanate with a phosgenation product of an aniline-formaldehyde condensate.

4. The process of claim 1 wherein said cross-linking agent is diethanolamine.

5. The process of claim 1 wherein alkali hydroxides are used as component (a).

6. The process of claim 1 wherein a halogenated aliphatic phosphoric acid ester is used as component (b).

7. The process of claim 1 wherein component (b) comprises trichloroethyl phosphate.

8. The process of claim 1 wherein about 1.8 to 4.5 parts of water are present based on 100 parts of said polyether.

9. The process of claim 2 wherein said cross-linking agent is diethanolamine.

10. The process of claim 3 wherein said cross-linking agent is diethanolamine.

11. A process for the production of a foam containing urethane groups by reacting a polyether containing at least 2 hydroxyl groups and having a molecular weight of 400 to about 10,000 with a polyisocyanate comprising a member selected from the group consisting of toluene diisocyanates, phosgenation products of aniline-formaldehyde condensates and mixtures thereof in the presence of about 1.8 to 4.5 parts of water per 100 parts of said polyether and
    (a) about 0.05 to 0.15 parts, based on 100 parts of said polyether, of an organic or inorganic compound which shows an alkaline reaction in aqueous medium and in which the group $(R-O)^{\ominus}Me^{\oplus}$ is present at least once, wherein $Me^{\oplus}$ is an alkali metal, optionally in complexed form, or a quaternary ammonium group and R represents hydrogen, alkyl, cycloalkyl, aryl or aralkyl groups, which may also contain heteroatoms, and also the groups $R'-CO-$, $R'-CS-$, $R'-CO-O-$, $R'-O-$ and $R'-CO-NH$, where $R'$ is one of the organic radicals mentioned in the definition of R,
    (b) a halogenated aliphatic phosphoric acid ester and,
    (c) about 0.08 to 7 parts, based on 100 parts of said polyether, of a cross-linking agent corresponding to the formula

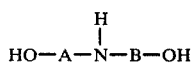

wherein A and B may be the same or different and represent $C_2-C_8$-alkylene or $C_5-C_8$-cycloalkylene radicals.

12. The process of claim 11 wherein said cross-linking agent is diethanolamine.

13. The process of claim 11 wherein alkali hydroxides are used as component (a).

14. The process of claim 12 wherein alkali hydroxides are used as component (a).

15. The process of claim 10 wherein component (b) comprises trichloroethyl phosphate.

16. The process of claim 11 wherein component (b) comprises trichloroethyl phosphate.

17. The process of claim 12 wherein component (b) comprises trichloroethyl phosphate.

18. The process of claim 13 wherein component (b) comprises trichloroethyl phosphate.

19. The foam obtained in accordance with the process of claim 1.

20. The foam obtained in accordance with the process of claim 10.

* * * * *